Sept. 22, 1936. R. C. DAHL 2,054,967
GOCART
Filed Nov. 13, 1935
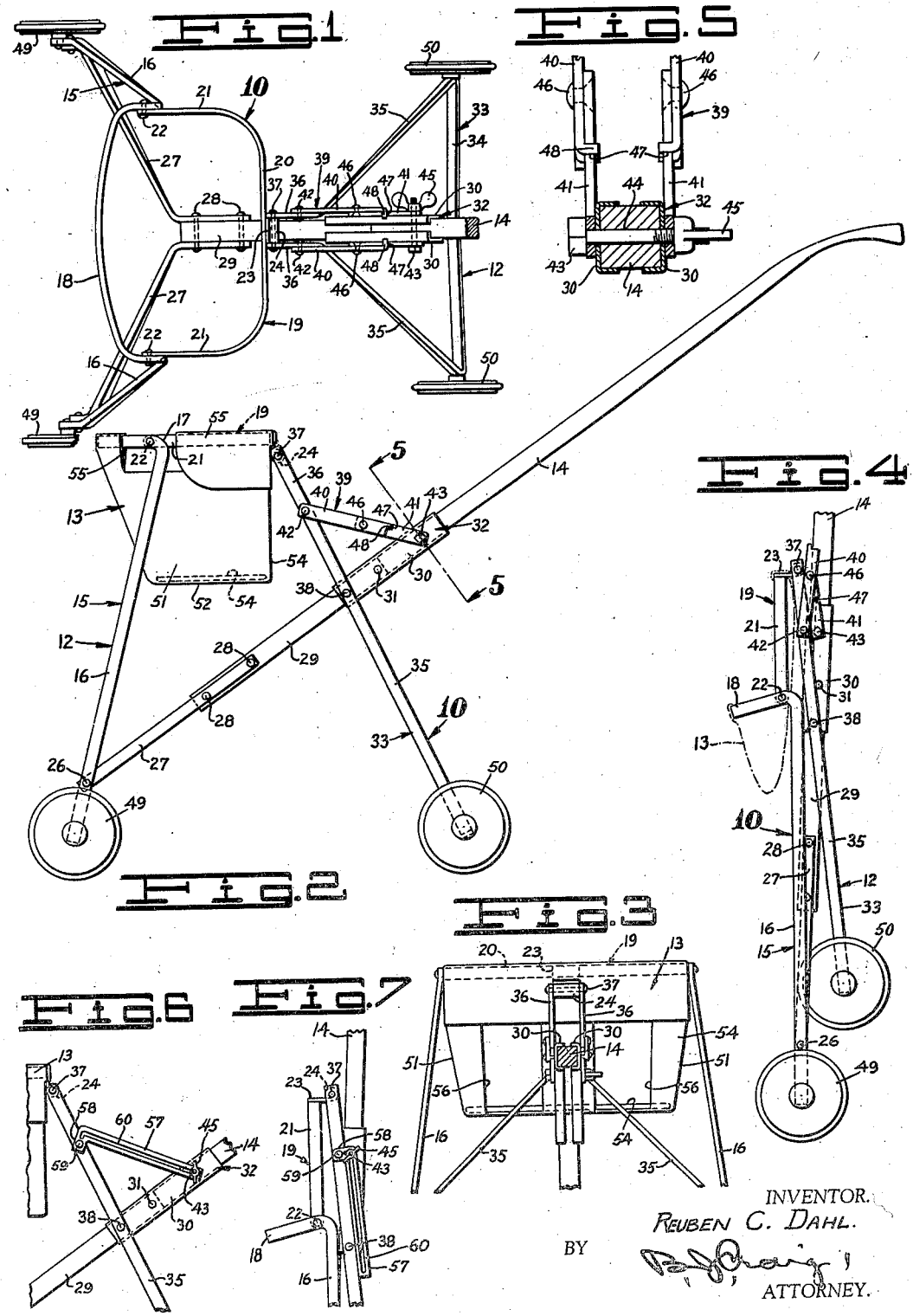
INVENTOR.
REUBEN C. DAHL.
BY
ATTORNEY.

Patented Sept. 22, 1936

2,054,967

UNITED STATES PATENT OFFICE 2,054,967

GOCART

Reuben C. Dahl, Pasadena, Calif.

Application November 13, 1935, Serial No. 49,496

10 Claims. (Cl. 280—41)

This invention relates to improvements in go-carts.

The general object of this invention is to provide an improved go-cart of the type wherein the infant rides in a sitting position.

Another object of the invention is to provide a novel go-cart which folds compactly when not in use.

Other objects and the advantages of this invention will be apparent from the following description taken in connection with the accompanying drawing, wherein:

Fig. 1 is a top plan view of my improved go-cart with the seat portion removed;

Fig. 2 is a side view of my improved go-cart;

Fig. 3 is a fragmentary front view of the go-cart;

Fig. 4 is a side view of the frame work of the go-cart showing it in a folded position;

Fig. 5 is a fragmentary enlarged section taken on line 5—5 of Fig. 2;

Fig. 6 is a fragmentary view similar to Fig. 2 showing a modified form of brace arm, and Fig. 7 is a view similar to Fig. 6 showing the frame in a folded position.

Referring to the drawing by reference characters I have indicated my improved go-cart generally at 10. As shown the device 10 comprises a supporting frame 12, a seat portion 13, and a handle portion 14. The frame 12 includes a rear member 15 which is made from a single length of metal bar and includes a pair of spaced side legs 16 which converge upwardly and are curved rearwardly as at 17 and then curve inwardly to form an arcuate back member 18. Extending forwardly from the rear member 15 I provide a substantially U-shaped front member 19 which is made from a single length of metal bar and includes a front portion 20 which is curved rearward to form spaced side arms 21. The side arms 21 adjacent their ends are each pivotally secured as by a rivet 22 to the rear member 15 slightly at the rear of the curved portions 17 thereof.

Secured to the front portion 20 as by welding it thereto intermediate the width thereof I provide a depending metal plate 23 which at its lower end is formed into a trunnion portion 24. Pivotally secured as by a rivet 26 to each of the rear legs 16 adjacent the lower ends thereof I provide a metal bar 27. The bar members 27 converge inwardly and are secured as by rivets 28 to wooden shaft portion 29.

A predetermined distance forward of the pivots 26 the shaft 29 has a metal channel member 30 positioned thereon with the flange portions thereof engaging the top and bottom surfaces of the shaft. The channel members 30 are secured to the shaft 29 by a rivet 31 and extend forward of the end of the shaft to form a socket portion 32 to receive the handle 14.

The handle 14, like the shaft portion 29, is preferably made of wood.

Mounted on the trunnion 24 I provide a front support member 33. The member 33 is made from a single length of metal bar and includes a transverse portion 34 and spaced upwardly convergent side legs 35 which are curved into straight upper portions 36. Adjacent their upper ends the legs 35 are pivotally secured to the trunnion 24 by a rivet 37. On the straight portions 36 adjacent the angular portions the legs 35 are pivotally secured to the channels 30 and the shaft 29 by a rivet 38.

Above the rivet 38 I provide a pair of metal brace arms 39 each of which includes a rear portion 40 and a front portion 41. The rear portions 40 of the brace arms are pivotally secured to the legs 35 intermediate the pivots 37 and 38 by rivets 42 and the front portions 41 are secured to the channel socket portion 32 adjacent the forward end thereof by a bolt 43 which is positioned in suitable apertures 44 provided in the members 41, the channels 32 and the handle 14. (See Fig. 5.) A wing nut 45 is provided on the bolt 43.

Intermediate the bolt 43 and the pivots 42 the front and rear portions 41 and 40 of the brace arms 39 are pivotally secured together by rivets 46. Intermediate the pivots 46 and the bolt 43 each of the front portions 41 has a notch 47 in the upper edge thereof. The rear portions 40 extend forward of the pivots 46 and include inturned finger portions 48 adjacent their upper edges which are adapted to be positioned in the notches of the front portions 41 when the device is in an operative position as shown in Fig. 2.

Rotatably mounted on each of the rear legs 16 adjacent the lower ends thereof I provide a wheel 49 and rotatably mounted on each of the front legs 35 adjacent the transverse portion 34 I provide wheels 50. The wheels 50 in some instances may be omitted and the front member 33 used as a support for the device when the device is not in motion. Likewise the rear wheels 49 may be omitted and the legs 16 used as a support when the device is not in motion.

The seat portion 13 is made from a suitable flexible material and includes spaced sides 51, a bottom 52, a back 53, and a front 54. The seat 13 is supported by the portion 18 of the rear member 15 and by the front member 19 which are positioned in loop portions 55 provided adjacent the top of the seat. The front 54 has a pair of spaced apertures 56 therein and the bottom 52 preferably has a stiffening member 57 suitably secured thereto.

When the device 10 is used to transport an infant it is in the position shown in Fig. 2 and the infant is positioned in the seat 13 with his legs extending out through the apertures 56 in the front wall of the seat.

To fold the device to the position shown in Fig. 4 the operator swings the brace arm pivots 46 upward and then swings the front portion 33 rearward and the handle portion 14 upward and rearward and in so doing swings the front member 19 upward and rearward about the pivots 22.

For transportation or for storage of the device 10 in a small space the handle 14 may be readily removed from the socket 32 by unscrewing the wing nut 45 and removing the bolt 43.

In Figs. 6 and 7 I have shown a modified form of brace arm at 57 which may be used in place of the brace arm 39. As shown the brace arm 57 is made from a single metal bar instead of in two sections as in the brace arm 39. Adjacent the rear the brace arm 57 includes a right angular portion 58 which is pivotally secured to the leg 35 by a rivet 59 intermediate the rivets 37 and 38. The brace arm 57 has an elongated slot 60 therein in which the bolt 43 is positioned. When the device is in an open position as shown in Fig. 6 bolt 43 is positioned adjacent the forward end of the slot 60 and the wing nut 45 firmly tightened to retain the brace arm in this position.

To fold the device to the position shown in Fig. 7 the wing nut is loosened and as the socket 32 is moved upward and rearward the bolt moves to the upper end of the slot 60.

From the foregoing description it will be apparent that I have provided a novel folding go-cart which is simple in construction and highly efficient in use.

Having thus described my invention I claim:

1. A go-cart, said go-cart including a supporting frame, said frame comprising a rear member, said rear member including a pair of spaced leg portions joined by a transverse portion and a seat supporting member including spaced side arms pivotally secured to said rear member, a front support member, said front support member adjacent the top thereof being pivotally secured to said seat supporting member, a shaft, said shaft intermediate the length thereof being pivotally secured to said front support member intermediate the length of said front support member, and a seat member, said seat member being made of a flexible material and being suspended from said seat supporting member.

2. A go-cart, said go-cart including a supporting frame, said frame comprising a rear member, said rear member including a pair of spaced leg portions joined by a transverse portion and a seat supporting member including spaced side arms pivotally secured to said rear member, a front support member, said front support member adjacent the top thereof being pivotally secured to said seat supporting member, a shaft, said shaft intermediate the length thereof being pivotally secured to said front support member intermediate the length of said front support member, means to restrict movement of said shaft in one direction and allow movement of said shaft in the opposite direction, a wheel rotatably mounted on each of said rear legs adjacent the lower ends thereof, a seat member, said seat member being made of a flexible material and being suspended from said seat supporting member.

3. A go-cart, said go-cart including a seat supporting member, said member including a pair of spaced side arms connected by a front portion, and a rear member including a transverse portion having legs thereon, said transverse portion and said arms being pivotally secured together, a pair of spaced upwardly convergent rear leg members, said legs at the upper ends thereof being secured to said seat supporting member, a front support member, said front support member comprising a transverse portion and spaced upwardly convergent leg portions including straight sections adjacent the top thereof, said straight sections adjacent the upper ends thereof being pivotally secured to said front portion of said seat supporting member, a shaft member, said shaft including outwardly inclined members each pivotally secured to an associated rear leg adjacent the lower end of said leg, said shaft being pivotally secured to said straight portion of said front support member, means to restrict movement of said shaft in one direction and allow movement of said shaft in the opposite direction, a wheel rotatably mounted on each of said rear legs adjacent the lower ends thereof, a seat member being made of a flexible material and being suspended from said seat supporting member.

4. A go-cart including a supporting frame, said frame including a rear member, said rear member including a pair of spaced upwardly convergent leg portions, said legs at the upper ends thereof extending rearwardly to merge with a rear transverse portion, a seat supporting member, said seat supporting member including a pair of spaced side arms connected by a seat supporting section, said side arms of said front member being pivotally secured to said rear member adjacent said rear legs, a trunnion member mounted on said front section intermediate the width thereof, a front support member, said front support member comprising a transverse portion and spaced upwardly convergent leg portions including straight sections adjacent the top thereof, said straight sections adjacent the upper ends thereof being pivotally secured to said trunnion member, a shaft member, said shaft including outwardly inclined members each pivotally secured to an associated rear leg adjacent the lower end of said leg, said shaft being pivotally secured to said straight portion of said front support member, means to restrict movement of said shaft in one direction and allow movement of said shaft in the opposite direction, a wheel rotatably mounted on each of said rear legs adjacent the lower ends thereof, a seat member, said seat member being made of a flexible material and being suspended from the top portion of said rear member and from said seat supporting member.

5. A go-cart including a seat supporting member, said member including spaced front and rear portions and spaced side portions, said side portions comprising two sections pivotally secured together, a pair of spaced upwardly convergent rear leg members, said legs at the upper ends thereof being secured to said seat supporting member, a front support member, said front support member comprising a transverse portion and spaced upwardly convergent leg portions including adjacent the top thereof straight sections, said straight sections adjacent the upper ends thereof being pivotally secured to said front portion of said seat supporting member, a shaft member, said shaft including outwardly inclined members each pivotally secured to an associated rear leg adjacent the lower end of said leg, said shaft being pivotally secured to said straight portion of said front support member, a pair of brace bars, each of said brace bars including a rear section and a front section pivotally secured together, each of said rear sections adjacent the rear thereof being pivotally secured to associated straight portions of said front support members intermediate the pivotal connection thereof with said seat supporting member and said shaft pivot, said brace bar front sections adjacent the forward ends being pivotally secured to said shaft, a wheel rotatably mounted on each of said rear legs adjacent the lower ends thereof and a seat member, said seat member being made of a flexible material and being suspended from said seat supporting member.

6. A go-cart including a supporting frame, said frame including a rear member, said rear member including a pair of spaced upwardly convergent leg portions, said legs at the upper ends thereof extending rearward to merge with a rear transverse portion, a seat supporting member, said seat supporting member including a pair of spaced side arms connected by a seat supporting section, said side arms of said seat supporting member being pivotally secured to said rear member adjacent said rear legs, a trunnion member mounted on said front section intermediate the width thereof, a front support member, said front support member comprising a transverse portion and spaced upwardly convergent leg portions including straight sections adjacent the top thereof, said straight sections adjacent the upper ends thereof being pivotally secured to said trunnion, a shaft member, said shaft including outwardly inclined members each pivotally secured to an associated rear leg adjacent the lower end of said leg, said shaft being pivotally secured to said straight portion of said front support member and a pair of brace bars, each of said brace bars including a rear section and a front section pivotally secured together, each of said rear sections adjacent the rear thereof being pivotally secured to associated straight portions of said front support member intermediate said trunnion and said shaft pivot, said brace bar front sections adjacent the forward ends being pivotally secured to said shaft, said brace bar front sections each having a notch in the upper edge thereof intermediate said two pivots thereof, a pair of wheels mounted on said frame and a seat member on said frame.

7. A go-cart including a supporting frame, said frame including a rear member, said rear member including a pair of spaced upwardly convergent leg portions, said legs at the upper ends thereof extending rearward to merge with a rear transverse portion, a seat supporting member, said seat supporting member including a pair of spaced side arms connected by a front section, said side arms of said seat supporting member being pivotally secured to said rear member, a trunnion member mounted on said front section, a front support member, said front support member comprising a transverse portion and spaced upwardly convergent leg portions including straight sections, said straight sections adjacent the upper ends thereof being pivotally secured to said trunnion, a shaft member, a channel member on each side of said shaft, said channels being secured to said shaft, said channels projecting beyond the forward end of said shaft to form a socket portion, a handle member, said handle being positioned in said socket, said shaft including outwardly inclined members each pivotally secured to an associated rear leg adjacent the lower end of said leg, said shaft being pivotally secured to said straight portion of said front support member, a pair of brace bars, each of said brace bars including a rear section and a front section pivotally secured together, each of said rear sections adjacent the rear thereof being pivotally secured to associated straight portions of said front support member intermediate said trunnion and said shaft pivot, said brace bar front sections being pivotally secured to said shaft by a bolt having a nut member thereon, said bolt being positioned in apertures in said channels within the length of said socket portion thereof and in an aperture in said handle, a wheel rotatably mounted on each of said rear legs adjacent the lower ends thereof and a seat member suspended from said frame.

8. A go-cart including a supporting frame, said frame including a rear member, said rear member including a pair of spaced upwardly convergent leg portions, said legs at the upper ends thereof being bent rearward to merge with a rearwardly bowed portion, a seat supporting member including a pair of spaced side arms connected by a front section, said side arms of said seat supporting member being pivotally secured to said rear member adjacent said bend of said rear legs, a trunnion member mounted on said front section intermediate the width thereof, a front support member comprising a transverse portion and spaced upwardly convergent leg portions including straight sections adjacent the top thereof, said straight sections adjacent the upper ends thereof being pivotally secured to said trunnion, a shaft member having a channel member on each side thereof adjacent the forward end, said channels projecting beyond the forward end of said shaft to form a socket portion, a handle member positioned in said socket, a metal strap secured to each side of said shaft adjacent the rear end thereof, each of said straps being inclined outwardly and being pivotally secured to an associated rear leg adjacent the lower end of said leg, said shaft within the length of said channels being pivotally secured to said straight portion of said front support member, a pair of metal brace bars, each of said brace bars including a rear section and a front section pivotally secured together, each of said rear sections adjacent the rear thereof being pivotally secured to associated straight portions of said front support member intermediate said trunnion and said shaft pivot, said brace bar front sections being pivotally secured to said shaft by a bolt having a nut member thereon, said bolt being positioned in apertures in said channels within the length of said socket portion thereof and in an aperture in said handle, a pair of wheels rotatably mounted on said frame and a seat member on said frame.

9. A go-cart including a supporting frame, said frame including a rear member, said rear member including a pair of spaced upwardly convergent leg portions, said legs at the upper ends thereof extending rearward to merge with a rear transverse portion, a seat supporting member, said seat supporting member including a pair of spaced side arms connected by a seat supporting section, said side arms of said seat supporting member pivotally being secured to said rear member adjacent said rear legs, a trunnion member mounted on said front section intermediate the width thereof, a front support member, said front support member comprising a transverse portion and spaced upwardly convergent leg portions including straight sections adjacent the top thereof, said straight sections adjacent the upper ends thereof being pivotally secured to said trunnion, a shaft member, said shaft having a channel member on each side thereof adjacent the forward end, said channels projecting beyond the forward end of said shaft to form a socket portion, a handle member, said handle being positioned in said socket, said shaft including outwardly inclined members pivotally secured to an associated rear leg adjacent the lower end of said leg, said shaft being pivotally secured to said straight portion of said front support member, a pair of metal brace bars, each of said brace bars including a substantially right angle finger portion adjacent the rear thereof pivotally secured to associated straight portions of said front support member intermediate said trunnion and said shaft pivot, said brace bars each having an elongated slot therein, a bolt member, said bolt being positioned in apertures in said channel members within the length of said socket portion thereof and in an aperture in said handle and in said slots of said brace bars, the head of said bolt engaging the outer surface of one of said brace bars and said bolt having a nut thereon opposite said head engaging the outer surface of the other of said brace bars.

10. A go-cart including a supporting frame, said frame including a rear member comprising a pair of spaced upwardly convergent leg portions, said legs at the upper ends thereof being bent rearward to merge with a rearwardly bowed portion, a seat supporting member including a pair of spaced side arms connected by a front section, said side arms of said seat supporting member being pivotally secured to said rear member adjacent said bend of said rear legs, a trunnion mounted on said front section intermediate the width thereof, a front support member comprising a transverse portion and spaced upwardly convergent leg portions including straight portions adjacent the top thereof, said straight sections adjacent the upper ends thereof being pivotally secured on said front section, a shaft having a metal channel member on each side thereof adjacent the forward end, said channels being positioned with the flanges thereof engaging the top and bottom surfaces of said shaft, said channels projecting beyond the forward end of said shaft to form a socket portion, a handle member positioned in said socket, a metal strap secured to each side of said shaft adjacent the rear end thereof, each of said straps being inclined outwardly and being pivotally secured to an associated rear leg adjacent the lower end of said leg, said shaft within the length of said channels being pivotally secured to said straight portion of said front support member, a pair of metal brace bars, each of said brace bars including a substantially right angle finger portion adjacent the rear thereof pivotally secured to associated straight portions of said front support member intermediate said trunnion and said shaft pivot, said brace bars each having an elongated slot therein, a bolt member, said bolt being positioned in apertures in said channel members within the length of said socket portion thereof and in an aperture in said handle and in said slots of said brace bars, the head of said bolt engaging the outer surface of one of said brace bars and said bolt having a nut thereon opposite said head engaging the outer surface of the other of said brace bars.

REUBEN C. DAHL.